(12) United States Patent  (10) Patent No.: US 7,467,491 B1
Slocum  (45) Date of Patent: Dec. 23, 2008

(54) FISHING LURE

(76) Inventor: Wilford D. Slocum, P.O. Box 31, Slaughter, LA (US) 70777

( * ) Notice: Subject to any disclaimer, the term of this patent is extended or adjusted under 35 U.S.C. 154(b) by 0 days.

(21) Appl. No.: 11/985,907

(22) Filed: Nov. 19, 2007

(51) Int. Cl.
A01K 85/10 (2006.01)

(52) U.S. Cl. .................................. 43/42.13; 43/42.14

(58) Field of Classification Search ............... 43/42.13, 43/42.14, 42.11, 42.19
See application file for complete search history.

(56) References Cited

U.S. PATENT DOCUMENTS

| | | | | | |
|---|---|---|---|---|---|
| 171,768 | A | * | 1/1876 | Buel | 43/42.14 |
| 1,295,617 | A | * | 2/1919 | Shannon | 43/42.13 |
| 1,467,116 | A | * | 9/1923 | Reekers | 43/42.19 |
| 1,620,972 | A | * | 3/1927 | Hobbs | 43/42.14 |
| 1,682,710 | A | * | 8/1928 | Pflueger | 43/42.13 |
| 1,731,161 | A | * | 10/1929 | Farley | 43/42.13 |
| 1,787,726 | A | * | 1/1931 | Heddon et al. | 43/42.13 |
| 1,820,887 | A | * | 8/1931 | Pflueger | 43/42.13 |
| 1,874,883 | A | * | 8/1932 | Brown | 43/42.14 |
| 1,897,529 | A | * | 2/1933 | Palmer et al. | 43/42.14 |
| 2,167,945 | A | * | 8/1939 | Gilliam | 43/42.13 |
| 2,206,274 | A | * | 7/1940 | Wiberg | 43/42.19 |
| 2,261,433 | A | * | 11/1941 | Demory | 43/42.13 |
| 2,266,234 | A | * | 12/1941 | Mitchell | 43/42.13 |
| 2,471,499 | A | * | 5/1949 | Shipman | 43/42.13 |
| 2,482,648 | A | * | 9/1949 | Brandt | 43/42.19 |
| 2,516,434 | A | * | 7/1950 | Swan | 43/42.14 |
| 2,572,721 | A | * | 10/1951 | Hatt | 43/42.19 |
| 2,589,932 | A | * | 3/1952 | Farley | 43/42.13 |
| 2,774,171 | A | * | 12/1956 | Pulver | 43/42.19 |
| 2,778,144 | A | * | 1/1957 | Jones et al. | 43/42.11 |
| 2,785,496 | A | * | 3/1957 | Menkens | 43/42.19 |
| 2,857,703 | A | * | 10/1958 | Parmlee | 43/42.28 |
| 3,118,244 | A | * | 1/1964 | Coburn | 43/42.13 |
| 3,131,504 | A | * | 5/1964 | Haulk | 43/42.16 |
| 3,648,397 | A | * | 3/1972 | Du Bois | 43/42.19 |
| 3,747,256 | A | * | 7/1973 | Haddock | 43/42.13 |
| 3,750,325 | A | * | 8/1973 | Feltman | 43/42.14 |
| 3,808,726 | A | * | 5/1974 | Flanagan, Jr. | 43/42.13 |
| 3,828,463 | A | * | 8/1974 | Perrin | 43/42.11 |
| 3,858,343 | A | * | 1/1975 | Goforth | 43/42.19 |
| 3,943,651 | A | * | 3/1976 | Erving | 43/42.13 |
| 3,996,688 | A | * | 12/1976 | Hardwicke, III | 43/42.11 |
| 4,003,154 | A | * | 1/1977 | Carver | 43/42.13 |
| 4,011,681 | A | * | 3/1977 | Johnson | 43/42.11 |
| 4,012,862 | A | * | 3/1977 | Dubois | 43/42.11 |
| 4,033,065 | A | * | 7/1977 | Shannon | 43/42.13 |
| 4,133,135 | A | * | 1/1979 | Miles | 43/42.13 |
| 4,201,008 | A | * | 5/1980 | Sparkman | 43/42.13 |
| 4,209,932 | A | * | 7/1980 | Pate | 43/42.13 |
| 4,329,804 | A | * | 5/1982 | Brown | 43/42.13 |
| 4,536,986 | A | * | 8/1985 | Stout | 43/42.11 |
| 4,551,940 | A | * | 11/1985 | East | 43/42.13 |

(Continued)

FOREIGN PATENT DOCUMENTS

FR    2729822 A1 * 8/1996

(Continued)

*Primary Examiner*—Darren W Ark
(74) *Attorney, Agent, or Firm*—Roy, Kiesel, et al.

(57) ABSTRACT

An improved fishing lure that is reliable and efficient to use in fishing operations, is disclosed. The invention is designed to provide an increased visual attraction, as well as to provide for a more natural and lifelike lure movement, to attract fish thereto.

12 Claims, 2 Drawing Sheets

U.S. PATENT DOCUMENTS

| | | | | |
|---|---|---|---|---|
| 4,571,877 A * | 2/1986 | Montgomery | ............. | 43/42.13 |
| 4,619,068 A * | 10/1986 | Wotawa | .................... | 43/42.13 |
| 4,625,448 A * | 12/1986 | Borders | .................... | 43/42.13 |
| 4,637,158 A * | 1/1987 | Reid | ........................ | 43/42.14 |
| 4,640,041 A * | 2/1987 | Stanley | ..................... | 43/42.14 |
| 4,671,007 A * | 6/1987 | Stanczyk | ................... | 43/42.13 |
| 4,718,191 A * | 1/1988 | Gentry | ..................... | 43/42.13 |
| 4,742,639 A * | 5/1988 | Gunn | ....................... | 43/42.13 |
| 4,765,085 A * | 8/1988 | Wotawa et al. | ............ | 43/42.13 |
| 4,769,940 A * | 9/1988 | Doss | ........................ | 43/42.13 |
| 4,773,180 A * | 9/1988 | Shimizu | ................... | 43/42.13 |
| 4,815,233 A * | 3/1989 | Pingel | ...................... | 43/42.13 |
| 4,884,358 A * | 12/1989 | Grove et al. | ............... | 43/42.13 |
| 4,888,908 A * | 12/1989 | Morris | ...................... | 43/42.14 |
| 4,891,901 A * | 1/1990 | Baker, Jr. | ................... | 43/42.13 |
| 5,016,386 A * | 5/1991 | Lamonica et al. | .......... | 43/42.14 |
| 5,022,177 A * | 6/1991 | Gibson | ..................... | 43/42.13 |
| 5,058,309 A * | 10/1991 | Firmin | ..................... | 43/42.13 |
| 5,138,789 A * | 8/1992 | Hood | ....................... | 43/42.13 |
| 5,146,706 A * | 9/1992 | Hilliard | .................... | 43/42.13 |
| 5,201,784 A * | 4/1993 | McWilliams | ............... | 43/42.13 |
| 5,355,612 A * | 10/1994 | Smith | ....................... | 43/42.13 |
| 5,381,621 A * | 1/1995 | Fuller | ....................... | 43/42.13 |
| 5,400,542 A * | 3/1995 | Johnson | ................... | 43/42.13 |
| 5,412,899 A * | 5/1995 | Reboul | ..................... | 43/42.13 |
| 5,491,926 A * | 2/1996 | Mostovsky | ................ | 43/42.13 |
| 5,499,470 A * | 3/1996 | Reed | ........................ | 43/42.13 |
| 5,505,015 A * | 4/1996 | Delricco | .................... | 43/42.13 |
| 5,517,782 A * | 5/1996 | Link et al. | ................. | 43/42.31 |
| D375,137 S * | 10/1996 | Bussard | .................... | D22/129 |
| 5,564,218 A * | 10/1996 | Kato | ........................ | 43/42.13 |
| 5,605,004 A * | 2/1997 | Boullt et al. | ............... | 43/42.13 |
| 5,647,163 A * | 7/1997 | Gorney | ..................... | 43/42.13 |
| 5,664,365 A * | 9/1997 | Walden | ..................... | 43/42.13 |
| 5,974,723 A * | 11/1999 | Taibi | ........................ | 43/42.13 |
| 6,041,538 A * | 3/2000 | Roemer | ..................... | 43/42.19 |
| 6,108,961 A * | 8/2000 | Milawski et al. | ........... | 43/42.13 |
| 6,112,451 A * | 9/2000 | Webb | ........................ | 43/42.19 |
| H1865 H * | 10/2000 | Aoki | ........................ | 43/42.13 |
| 6,158,162 A * | 12/2000 | Loniello | .................... | 43/42.13 |
| 6,173,521 B1 * | 1/2001 | Rockhill, Jr. | ............... | 43/42.13 |
| 6,199,312 B1 * | 3/2001 | Link | ......................... | 43/42.24 |
| 6,266,914 B1 * | 7/2001 | Johnson et al. | ............. | 43/42.13 |
| 6,601,336 B1 * | 8/2003 | Link | ......................... | 43/42.13 |
| 6,675,524 B2 * | 1/2004 | McNally et al. | ............ | 43/42.13 |
| 6,684,559 B2 * | 2/2004 | Johnson et al. | ............. | 43/42.13 |
| 6,701,662 B1 * | 3/2004 | Moore | ....................... | 43/42.13 |
| D493,508 S * | 7/2004 | Kierst | ....................... | D22/129 |
| 7,010,881 B2 * | 3/2006 | Altman | ..................... | 43/42.13 |
| 7,360,335 B2 * | 4/2008 | Edwards | .................... | 43/42.13 |
| 2003/0074828 A1 * | 4/2003 | Sprouse | ..................... | 43/42.13 |
| 2003/0145510 A1 * | 8/2003 | Kohigashi et al. | .......... | 43/42.13 |
| 2003/0159327 A1 * | 8/2003 | Roemer | ..................... | 43/42.13 |
| 2003/0233782 A1 * | 12/2003 | Routsaw | .................... | 43/42.13 |
| 2004/0006908 A1 * | 1/2004 | Essad et al. | ................ | 43/42.13 |
| 2004/0074134 A1 * | 4/2004 | Morlen | ...................... | 43/42.13 |
| 2005/0039373 A1 * | 2/2005 | Essad et al. | ................ | 43/42.19 |
| 2005/0166444 A1 * | 8/2005 | Taylor | ....................... | 43/42.13 |
| 2006/0005458 A1 * | 1/2006 | Maki et al. | ................. | 43/42.13 |
| 2007/0277423 A1 * | 12/2007 | Edwards | .................... | 43/42.13 |

FOREIGN PATENT DOCUMENTS

| | | | | |
|---|---|---|---|---|
| JP | 2001078626 A | * | 3/2001 | |
| JP | 2001245557 A | * | 9/2001 | |
| JP | 2002065116 A | * | 3/2002 | |
| JP | 2002142615 A | * | 5/2002 | |
| JP | 2002291377 A | * | 10/2002 | |
| JP | 2002360127 A | * | 12/2002 | |
| JP | 2002369641 A | * | 12/2002 | |
| JP | 2003180203 A | * | 7/2003 | |
| JP | 2004049125 A | * | 2/2004 | |
| JP | 2004089030 A | * | 3/2004 | |
| JP | 2004113038 A | * | 4/2004 | |

* cited by examiner

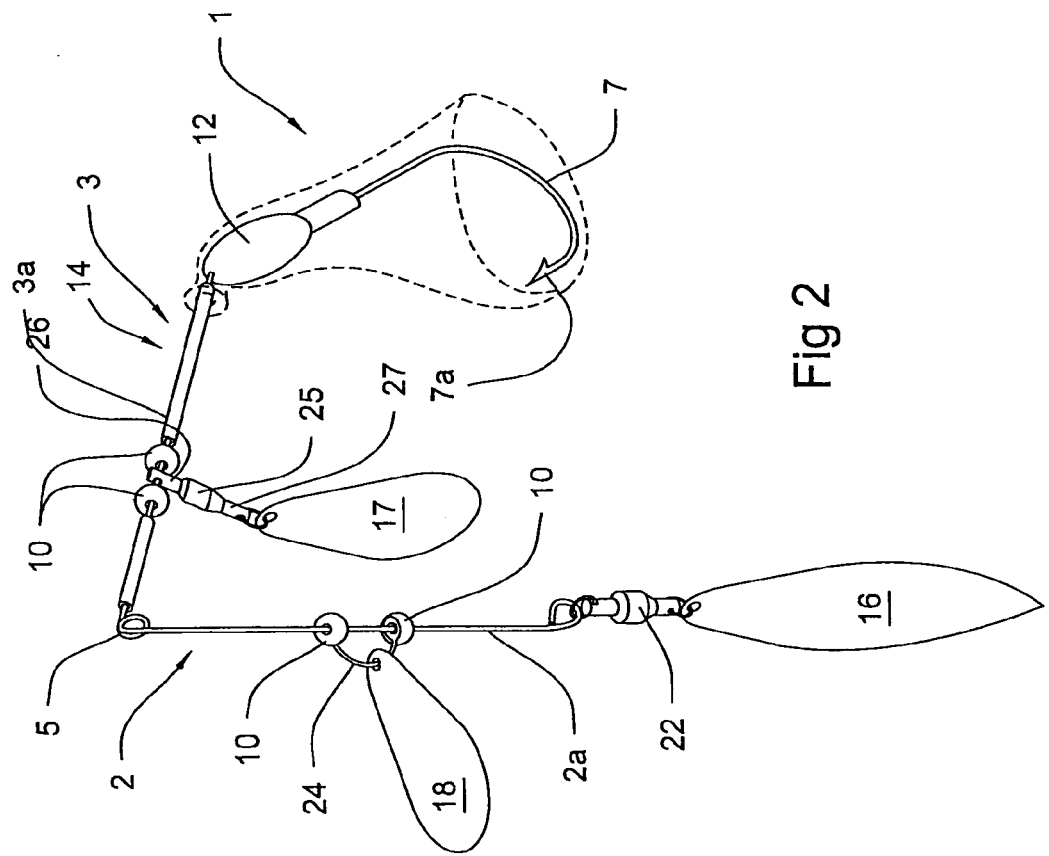
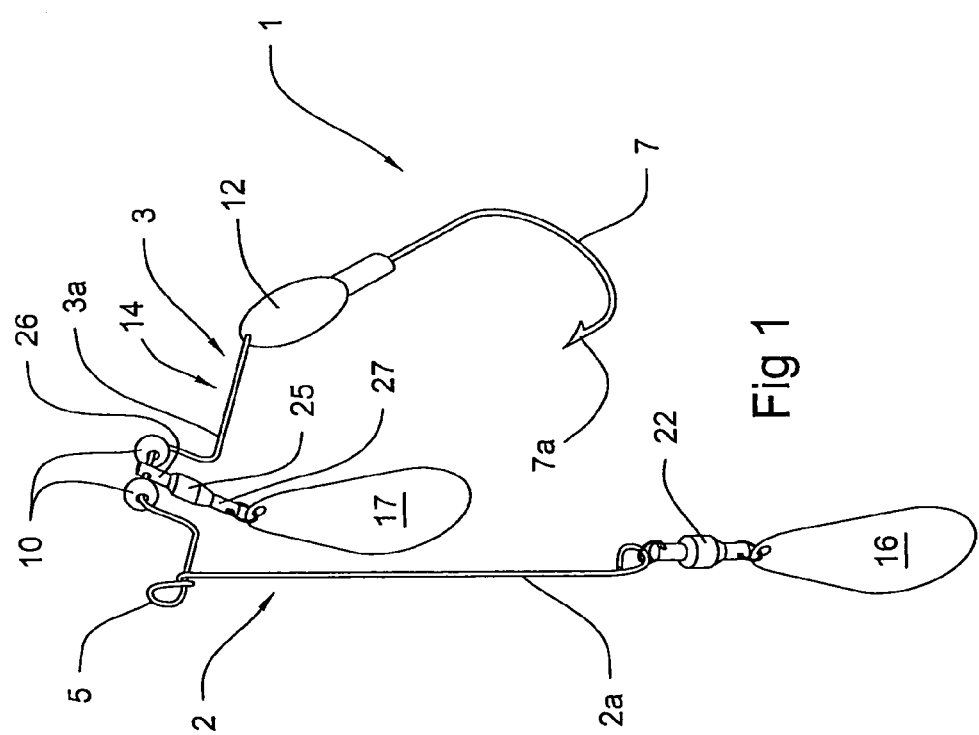

FISHING LURE

BACKGROUND OF THE INVENTION

1. Field of the Invention

This invention relates to fishing lures in general and to a new and improved spinner-type fishing lure, in particular.

2. Prior Art

Fishing lures of many designs and configurations and comprising various combinations of components such as beads, spoons, spinners, hooks, and connectors are well known and utilized in the prior art. Such fishing lures utilize various means for triggering strike behavior in fish, and are to a varying degree successful, however an improvement over what is available in the prior art is desired. For example, many such prior art fishing lures are not very effective because they do not generate sufficient vibration or flash to attract the fish. Other types of prior art fishing lures create an unnatural and erratic movement of the lure through the water. This in turn, results in a presentation of the lure that is not life-like, and thus unlikely to result in a strike. Another disadvantage of many prior art fishing lures is that they often do not create enough drag in the water to allow the fisherman to reel in the fishing line slowly. This is particularly undesirable for fish that are not very aggressive, as it does not give them sufficient time to strike the bait. Thus, many of these prior art fishing lures are neither efficient nor reliable and their use often results in unsatisfactory fishing results. In addition, many of these prior art fishing lures are often complicated in construction, thereby making it difficult for novice users to utilize them. Such fishing lures also have increased manufacturing costs due to their complexity. For these reasons, a fishing lure meeting the following objectives would be highly desirable.

OBJECTS OF THE INVENTION

It is an object of this invention to provide an improved fishing lure that overcomes the disadvantages of the prior art.

It is another object of this invention to provide an improved fishing lure that allows for a more natural and lifelike lure movement.

It is yet another object of this invention to provide an improved fishing lure that is more visually appealing to the fish.

It is another object of this invention to provide an improved fishing lure that increases the likelihood of a strike from a fish.

It is another object of this invention to provide an improved fishing lure that is reliable, efficient, and easy to use.

Yet another object of this invention is to provide an improved fishing lure that is simple in construction and thus capable of being manufactured at a reduced cost.

These and other objects of the invention shall become apparent from the ensuing figures and descriptions of the invention.

SUMMARY OF THE INVENTION

An improved fishing lure is disclosed. The fishing lure generally comprises a shank having a hook and a line engaging end; the shank further comprising a first leg remote from the hook; the shank further comprising a second leg terminating into the hook; the two legs further merging into the line-engaging end; the fishing lure further comprising at least one spinner situated off of the first leg; the fishing lure further comprising at least one spinner situated off of the second leg.

BRIEF DESCRIPTION OF THE FIGURES

The accompanying drawings illustrate a preferred embodiment of this invention. However, it is to be understood that these embodiments are not intended to be exhaustive, nor limiting of the invention. They are but examples of some of the forms in which the invention may be practiced.

FIG. 1 is a perspective view of a preferred embodiment of the improved fishing lure of the present invention, depicting a spinner situated at a preferred position on the first leg of the shank, and further depicting a spinner situated at a preferred position on the second leg of the shank.

FIG. 2 is a perspective view of another preferred embodiment of the improved fishing lure of the present invention, depicting a plurality of spinners situated at preferred positions on the first leg of the shank, and further depicting a spinner situated at a preferred position on the second leg of the shank, and further depicting a skirt attached to the weighted head of the shank in the conventional manner.

DETAILED DESCRIPTION OF THE INVENTION

Figure 3:
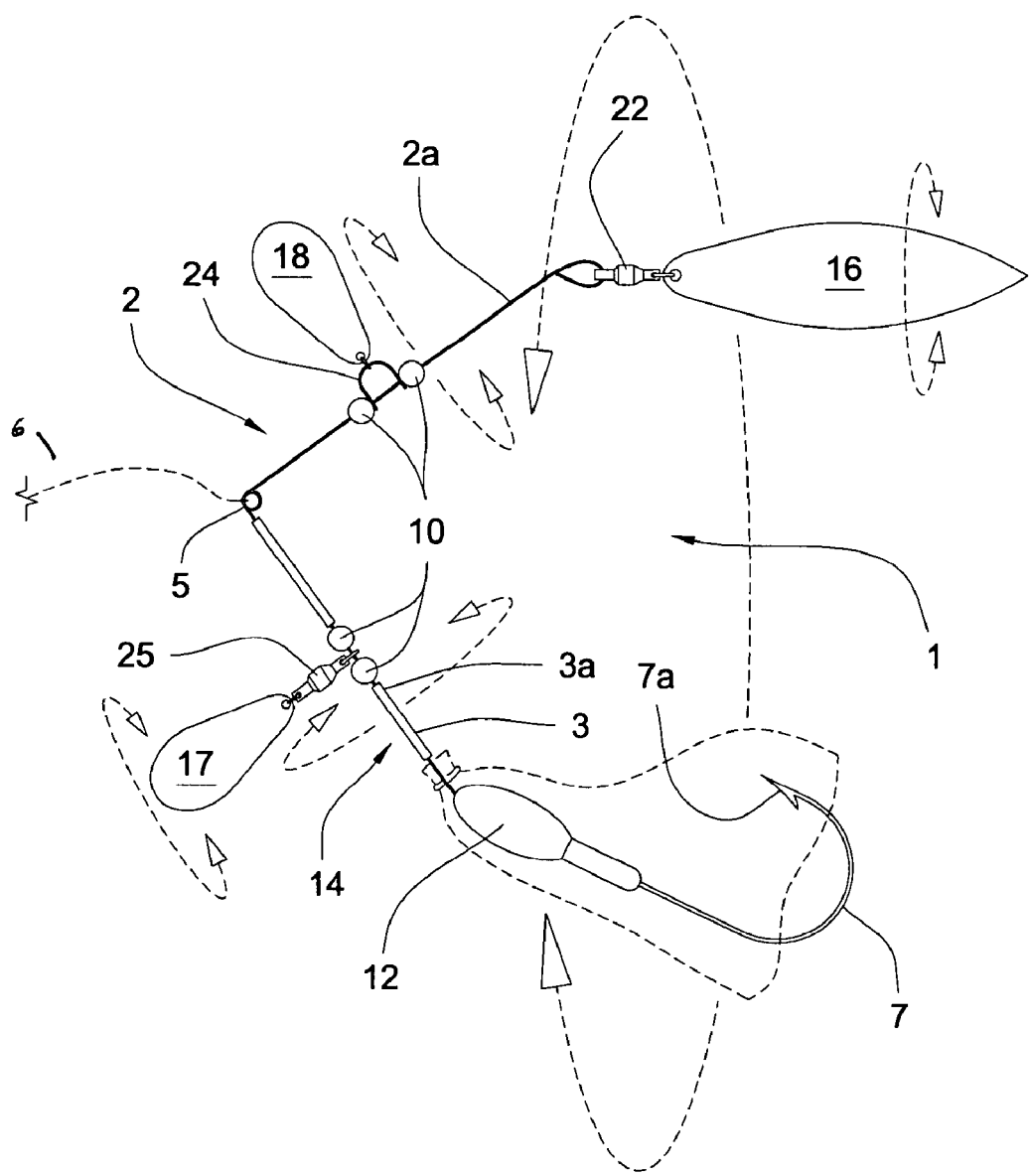
FIG. 3 depicts the vibration and rotational movements of the lure and the spinners during operation.

An improved fishing lure 1 is disclosed. The invention is designed to provide a visually appealing lure to the fish, as well as to allow for a more natural and lifelike artificial lure movement, to increase chances of a strike, in fishing operations. Without any intent to limit the scope of this invention, reference is made to the Figures in describing the preferred embodiments of the invention.

The fishing lure 1 of the invention is relatively simple, yet durable, in construction. The fishing lure 1 can be designed to be of whatever size is suitable for the particular fishing situation. Referring now to FIGS. 1 and 2, the fishing lure 1 generally comprises an elongated shank 14, comprising a first leg 2 and a second leg 3. In a preferred embodiment, the legs 2 and 3 can be of any desirable length. In constructing the legs 2 and 3, the inventor contemplates using metal, such as brass or steel. However, it is anticipated that various other suitable materials could also be acceptable to construct the legs 2 and 3, these materials being advantageous in view of cost and ease of manufacture considerations. The fishing lure 1 further comprises a hook 7 for penetration into the mouth of the fish when the fishing lure 1 is set. The hook 7 may be provided with a terminal barb 7a to help retain the fish on fishing lure 1. However, in general, fishing lures containing terminal barbs cause more damage to the mouths of hooked fish than fishing lures without such barbs. Thus, it may be desirable to omit terminal barb 7a, particularly when the fishing lure 1 is used in a catch and release environment. In the construction and design of the fishing lure 1, the first leg 2 will be distal from the hook 7, and the second leg 3 will terminate into the hook 7, the two legs 2 and 3 further merging into a line-engaging end 5 for connection to a fishing line 6. In a preferred embodiment, a swivel will be interposed between the line-engaging end 5 and the fishing line to prevent the fishing line from twisting on itself when the lure 1 is pulled through the water.

In a further preferred embodiment, the shank 14 will be bent such that the first leg 2 and the second leg 3 are situated at an acute angle to each other to form a general "V" shape, however it is anticipated that numerous configurations and shapes of the shank are acceptable, depending on suitability for a particular application.

As depicted by FIG. 1, the fishing lure 1 may further be provided with a weighted head 12 from which the hook 7 extends. The weighted head 12 is preferably formed of cast lead, however other acceptable materials may also be substituted. In a preferred embodiment, the weighted body 12 is configured to resemble a small bait fish with an eye, however, it is anticipated that that the body 12 may resemble other shapes which may also be attractive to fish, such as insects of frogs. In a preferred embodiment, it may also be desirable to provide the fishing lure 1 with artificial and natural attractants, such as plastic skirts, scented bait, pieces of meat, worms, minnows, etc, attached to the hook 7/head 12 via the known conventional manner in the art. In one preferred embodiment, as depicted by FIG. 2, the hook 17 is provided with a skirt body (shown in phantom), such that the skirt will trail behind the hook 7 and hide the hook 7 as the fishing lure 1 is being pulled through the water.

Still referring to FIGS. 1 and 2, in a further preferred embodiment of the invention, the fishing lure 1 will comprise a plurality of spinners rotatably attached to the legs 2 and 3. In a preferred embodiment, the spinners will be blades i.e. flat metal plates, generally having a oval form. Alternatively, the spinners may comprise spoons, i.e. having one surface that is concave and the other surface being convex. In a preferred embodiment, the spinners will have a bright shiny appearance so that they will produce a flashing effect when rotated. The aforementioned blade/spoon spinner configuration is preferred over other spinner configurations often utilized in the prior art, such as spinners in the shape of elongated twisted bodies, this configuration disadvantageous because it increases the risk of entanglement of the fishing lure/spinner in weeds and debris.

Turning now to a discussion of the preferred positioning of the spinners on the shank 14, in a preferred embodiment at least one spinner 16 will be rotatably mounted to the first leg 2. More preferably, the spinner 16 will be attached via a swivel 22 at the terminal end 2a of the first leg 2. In a further preferred embodiment, a spinner 17 will also be mounted to the second leg 3 via a swivel 25, at a position between the weighted head 12 and the line-engaging end 5. The swivel 25 having a first end 26 rotatably mounted to the second leg 3 and a second end 27 attached to the second spinner 17, the swivel 25 rotatably mounts the spinner 17 to the second leg 3 such that the second spinner can rotate completely around the second leg. It is preferred that this spinner 17 be situated at approximately the midpoint 3a of the second leg 3. It is preferred that the spinner 17 not be positioned on the hook 7 or the weighted head 12 itself, so as to avoid interference between the spinner 17 and the attractants mounted on the hook 7/head 12, as depicted in FIG. 3. In a further preferred embodiment, this spinner 17 will be fixedly secured to the second leg 3 via beads 10 which are preferably formed of translucent clear or colored plastic or crystal, these beads 10 being fixedly mounted on either side of the spinner 17. Additionally, it is believed the use of the clear/translucent beads is desired because it helps to catch light and enhance the attractiveness of the lure 1 to fish. As depicted by FIGS. 1 and 2, a bend and/or spacer can also be provided to second leg 3, to aid in the retention of the spinner 17 thereto.

In a further preferred embodiment, and as depicted by FIG. 2, an additional spinner 18 will be rotatably mounted to the first leg 2, preferably forward of spinner 16, located at terminal end 2a of first leg 2. In a preferred embodiment, this spinner 18 will be slidably mounted to the first leg 2. This spinner 18 will be secured to the first leg 2 via a half-ring 24 that receives first leg 2. Beads 10 will be slidably fit on either side of the spinner 18. The beads 10 will function to space the sliding spinner 18 apart from the terminal spinner 16 so that they will not interfere with each other.

Continuing with the discussion of the preferred configuration and positioning of the spinners on the shank 14, in one preferred embodiment, as depicted by FIG. 2, the spinner 16 will be larger than the spinners 17 and 18, and comprise an elongated, teardrop shape, with spinners 17 and 18 being smaller and comprising a more rounded shape. In another embodiment, as depicted by FIG. 1, the spinner 16 and the spinner 17 will be virtually the same size and shape. However, it is contemplated that the spinners can be of any size or configuration suitable to produce the desired flash and vibration. It is further preferred that the spinners 16, 17, and 18 depend directly and immediately off of the shank 14, as opposed to depending off of any type of intermediate extensions, as often done in the prior art. Not having any intermediate extensions is desirable because it is important to keep the spinners as close to the body of the shank 14 and the hook 7 as possible to increase the chances of a hookup with the fish. In such a scenario, it is more likely that a fish, when striking the spinners will also take the hook 7 into its mouth. In contrast, should the spinners be situated off an intermediate body that extends from the shank 14, a fish is much more likely to strike the spinners without taking the hook 7 into its mouth, thereby rendering hookup with the fish more difficult. Not having any intermediate extensions is further desirable because such elongated extensions also are susceptible to becoming snagged in weeds, plants and debris, as the fishing line is dragged through water. In this fashion, the fishing lure of the present invention is more snag resistant, so that it can be used for fishing closer to the bottom of the body of the water.

As can be seen from the foregoing discussion, the fishing lure 1 of the present invention is relatively simple in construction and accordingly can be manufactured at a reduced cost.

In operation, and as depicted by FIG. 3, the fishing lure 1 will be connected to a fishing line 6, shown in phantom. The particular selection of the arrangement and configuration of the components of the fishing lure 1 as described will provide an improved action of the spinners and the lure 1, when pulled through the water. As the lure 1 is being reeled through the water, the spinners 16 and 17 will rotate about their respective axes, spinner 17 also capable of rotation about the second leg 3, depending on current, as depicted by FIG. 3. As further depicted by FIG. 3, while all these movements are occurring, the spinner 18 will rotate around the first leg 2, also being free to slide along the length of the first leg 2. The lure 1 itself will rotate about its own axis as it is being pulled through the water. Thus, the fishing lure 1 will generate a plurality of distinct vibrations at different points, such that the fishing lure 1, in effect, imitates a plurality of prey. What in effect is achieved is that the lure 1, passing through the water, is in a state of perpetual imbalance, generating dynamic and erratic motion, similar to that of live prey. In this fashion, a more lifelike presentation of the lure is achieved and realism is generated. Furthermore, as the spinners 16, 17, and 18 move about in the water, they reflect light in a variety of directions to attract the fish. Thus, the fishing lure creates unique vibrations and enhanced visual appeal, rendering it much more attractive to the fish and inducing them to strike at the hook 7. Furthermore, the drag and weight created by the spinners 16, 17, 18 allows the fisherman to reel in the fishing line slowly, giving the less aggressive fish time to strike. Accordingly, not only is the spinner lure 1 effective for aggressive fish, such as bass, but it is also effective for other types of fish which may be more timid.

In summary, the lure 1 of the present invention comprises a unique selection and assembly of components to impart unique movements and vibrations such that its attractiveness to fish is enhanced. The lure 1 looks and moves convincingly like prey, but at the same time, is versatile, inexpensive, and simple in construction. While the invention has been described in terms of its preferred embodiment, other embodiments will be apparent to those of skill in the art from a review of the foregoing. Those embodiments as well as the preferred embodiments are intended to be encompassed by the scope and spirit of the following claims.

What I claimed is:

1. A fishing lure comprising:
   a. a shank having a hook and a line-engaging end;
   b. the shank further comprising a first leg remote from the hook;
   c. the shank further comprising a second leg terminating into the hook;
   d. the first and second legs further merging into the line-engaging end;
   e. the fishing lure further comprising a first spinner situated off of the first leg;
   f. the fishing lure further comprising a second spinner situated off of the second leg, wherein the second spinner is rotatable and fixedly mounted near a middle region of the second leg at a location which is between the line-engaging end and the hook such that the second spinner rotates around its axis when the fishing lure is pulled through the water;
   g. the fishing lure further comprising a weighted head, wherein the hook extends from the weighted head, and wherein the second spinner is mounted near the middle region of the second leg at the location which is between the line-engaging end and the weighted head; and
   h. the fishing lure further comprising the second spinner being rotatable mounted near the middle region of the second leg by a swivel with first and second ends, the first end of the swivel being rotatable attached near the middle region of the second leg such that the second spinner can rotate completely around the second leg, and the second end of the swivel being attached to the second spinner.

2. The fishing lure according to claim 1, wherein the first spinner is situated immediately off of the first leg.

3. The fishing lure according to claim 1, wherein the first spinner is rotatably mounted to an end portion of the first leg, such that the first spinner rotates around its axis when the fishing lure is pulled through the water.

4. The fishing lure according to claim 1, wherein a skirt is attached to the weighted head.

5. The fishing lure according to claim 1 further comprising a third spinner situated off of the first leg.

6. The fishing lure according to claim 5, wherein the third spinner is slidably mounted to the first leg.

7. The fishing lure according to claim 5, wherein the third spinner is configured to rotate about the first leg when the fishing lure is pulled through the water.

8. A fishing lure comprising:
   a. a shank having a hook and a line-engaging end;
   b. the shank further comprising a first leg remote from the hook;
   c. the shank further comprising a second leg terminating into the hook;
   d. the first and second legs further merging into the line-engaging end;
   e. the fishing lure further comprising a first spinner situated off of the first leg;
   f. the fishing lure further comprising a second spinner situated immediately off of the second leg, wherein the second spinner is rotatable and fixedly mounted near a middle region of the second leg at a location which is between the line-engaging end and the hook such that the second spinner rotates around its axis when the fishing lure is pulled through the water;
   g. the fishing lure further comprising a weighted head, wherein the hook extends from the weighted head, and wherein the second spinner is mounted near the middle region of the second leg at the location which is between the line-engaging end and the weighted head; and
   h. the fishing lure further comprising the second spinner being rotatable mounted near the middle region of the second leg by a swivel with first and second ends, the first end of the swivel being rotatable attached near the middle region of the second leg such that the second spinner can rotate completely around the second leg, and the second end of the swivel being attached to the second spinner.

9. The fishing lure according to claim 8, wherein the first spinner is rotatably mounted to an end portion of the first leg, such that the first spinner rotates around its axis when the fishing lure is pulled through the water.

10. The fishing lure according to claim 8 further comprising a third spinner situated off of the first leg.

11. The fishing lure according to claim 10, wherein the third spinner is slidably mounted to the first leg.

12. The fishing lure according to claim 11, wherein the third spinner is configured to rotate about the first leg when the fishing lure is pulled through the water.

\* \* \* \* \*